(No Model.)

J. S. OVENS.
OIL CAKE TRIMMER.

No. 545,716. Patented Sept. 3, 1895.

WITNESSES:
Jonn Twitchell
H. P. Hutchinson

INVENTOR
J. S. Ovens
BY
[signature]
ATTORNEYS.

UNITED STATES PATENT OFFICE.

JOHN S. OVENS, OF BUFFALO CENTER, IOWA.

OIL-CAKE TRIMMER.

SPECIFICATION forming part of Letters Patent No. 545,716, dated September 3, 1895.

Application filed November 13, 1894. Serial No. 528,636. (No model.)

*To all whom it may concern:*

Be it known that I, JOHN S. OVENS, of Buffalo Center, in the county of Winnebago and State of Iowa, have invented a new and Improved Oil-Cake Trimmer, of which the following is a full, clear, and exact description.

My invention relates to improvements in a machine for trimming the edges of oil-cakes. These cakes are trimmed to render them fit for the market, this operation being usually performed by hand; and the object of my invention is to produce a very simple, durable, and efficient machine by which these cakes may be evenly trimmed, and also to construct and arrange the apparatus so that the trimmings may be saved.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
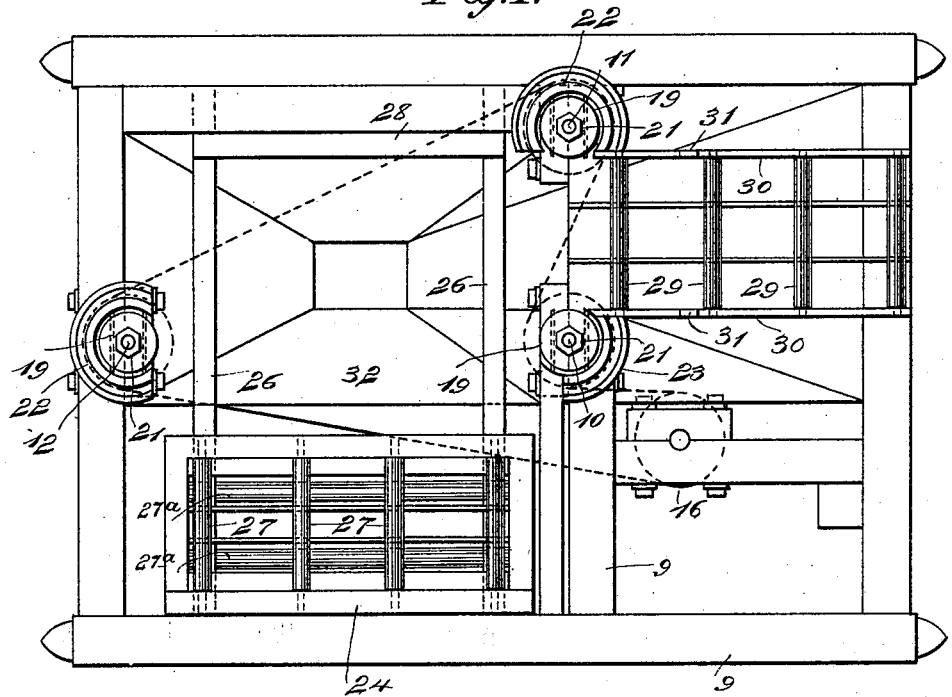
Figure 2:
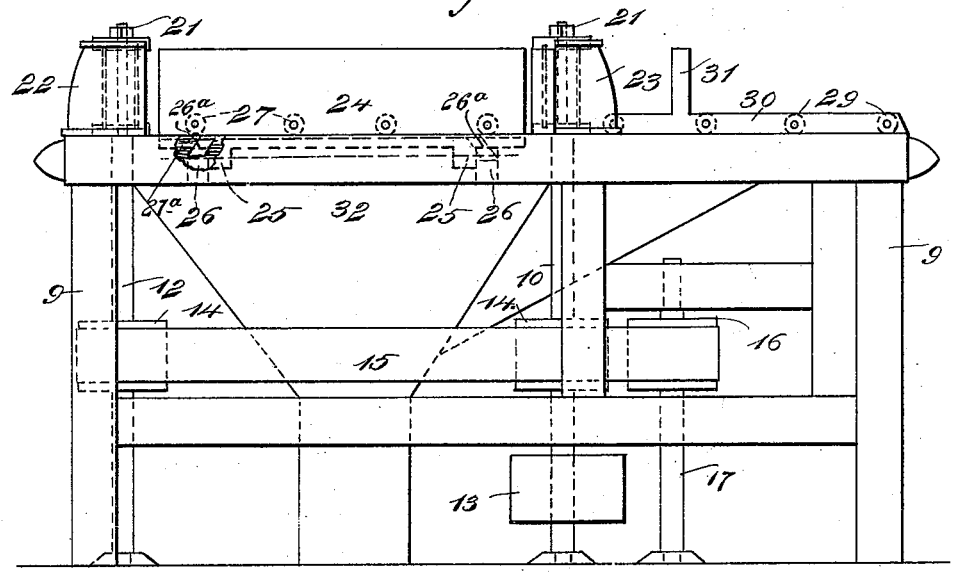
Figure 3:
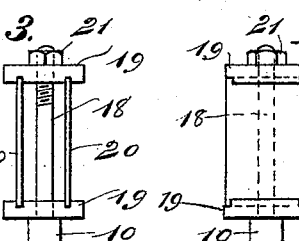
Figure 4:
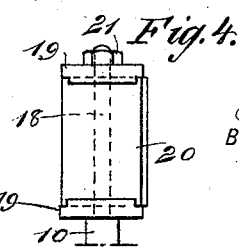

Figure 1 is a plan view of the machine embodying my invention. Fig. 2 is a side elevation of the same. Fig. 3 is a detail edge view of one of the cutter-heads, and Fig. 4 is a side elevation of the same.

The machine is provided with a suitable and substantial frame 9, in which is arranged vertically a driving-shaft 10, and disposed at different points in the machine are other vertical shafts 11 and 12, the three shafts being triangularly placed, as shown in Fig. 1, and the driving-shaft is provided with a suitable pulley 13 to which power may be applied. The shafts 10, 11, and 12 each carry a cutter-head, and each is provided with a pulley 14 over which runs a belt 15, the belt also extending around an idler 16 on a shaft 17, (see Fig. 2,) and thus a rotary movement is imparted to all the shafts by a single belt. The shafts are mounted in suitable bearings in the frame and are also stepped in suitable supports. Each of the shafts 10, 11, and 12 has a reduced upper end 18, which is screw-threaded, and to which is attached a cutter-head, comprising the upper and lower collars 19 (see Fig. 4) and the parallel knives 20, which are held between the collars and are fastened by nut 21, which is screwed to the shaft and bears on the top collar. The cutter-heads come above the top of the machine-frame, and as the oil-cakes are oblong the distance between the cutter-heads on the shafts 10 and 12 is greater than the distance between the cutter-heads on the shafts 10 and 11, so that when a cake is pushed sidewise between the two former cutter-heads its ends will be trimmed and when it is pushed endwise between the two latter cutter-heads its sides will be trimmed.

The cutter-heads on the shafts 11 and 12 are protected by guards 22, which extend about two-thirds of the way around the cutter-heads, leaving open spaces on the sides next the cakes, so that the cutter-heads may come in contact with the cakes. The cutter-head on the shaft 10 is protected by a guard 23, extending only about one-third the way around the cutter-head, as it is necessary for this cutter-head to work on both the end and side of the cake, as will appear from the description to follow. The cake to be trimmed is first placed on the carrier 24, which is provided with transverse rollers 27, so that the cake may be pushed easily off it, and it has on its under side guides 25, which run against rails 26 on the frame 9, and thus it may be pushed readily inward between the cutter-heads on the shafts 10 and 12. The carrier 24 has rollers 27$^a$ on the under side to run on the rails 26, and it has scrapers 26$^a$, which project over the said rails and prevent trimmings from accumulating on them. A stop 28 on the frame limits the inward movement of the carrier, and when the carrier abuts with this stop the cake thereon will be in position to be pushed longitudinally between the cutter-heads on the shafts 10 and 11, and behind these cutter-heads are rollers 29, which receive the trimmed cake, these rollers being journaled in side supports 30, which have guides 31 projecting upward to prevent the displacement of the cake. The cake to be trimmed is placed longitudinally on the carrier 24 and the carrier is pushed inward between the cutter-heads on the shafts 10 and 12, which, as they revolve rapidly, trim the ends of the cake, and when the carrier reaches the stop 28 the cake is then pushed endwise between the cutter-heads on the shafts 10 and 11, and its side edges are trimmed, after which it is delivered ready for the market on the rollers 29, from which it may be readily removed. The trimmings from the cake drop into a hopper 32, which is arranged beneath the cutter-heads, and the trimmings may be caught in any suitable receptacle. The machine is intended particularly for trimming oil-cakes; but it will be understood that it may be used for trimming other articles of similar shape.

Having thus described my invention, I claim as new and desire to secure by Letters Patent—

1. A machine for trimming oil cakes and the like, comprising three revoluble cutters, and a carrier adapted to be moved between the cutters triangularly arranged which are in longitudinal alignment to permit the ends of the cake to be trimmed and to be stopped opposite the cutters in transverse alignment, whereby the cake may be pushed from the carrier between the cutters in transverse alignment to permit the sides thereof to be trimmed, as set forth.

2. A machine for trimming oil cakes and the like, comprising a supporting frame, three revoluble cutter-heads mounted triangularly in said frame, a transversely movable carrier on the frame and adapted to be moved between the cutter heads in longitudinal alignment to permit the ends of the cake carried by the carrier to be trimmed and to be stopped opposite the cutter heads in transverse alignment, whereby the cake may be pushed from the carrier between the cutter heads in transverse alignment to trim the sides thereof, and a roller bed in rear of the said cutter heads to receive the trimmed cake, substantially as described.

3. A machine for trimming oil cakes and the like, comprising a frame, the vertical shafts 10, 11 and 12 mounted in the frame, said shafts being triangularly arranged, cutter heads on the ends of said shafts, guards for the said cutter heads, the guards for the cutter heads of the shafts 11 and 12 extending about two-thirds of the way around the heads and the guard for the head of the shaft 10 about one-third of the way around the cutter head, a carrier adapted to move transversely of the frame between the cutter heads of the shafts 10 and 12, and a roller bed in rear of the cutter heads of the shafts 10 and 11, substantially as herein shown and described.

JOHN S. OVENS.

Witnesses:
W. M. OVENS,
E. J. FLYNN.